US007001623B2

(12) United States Patent
Summer et al.

(10) Patent No.: US 7,001,623 B2
(45) Date of Patent: Feb. 21, 2006

(54) FLOWABLE COTTONSEED AND METHOD FOR ITS PREPARATION

(75) Inventors: Paul Summer, Oskaloosa, IA (US);
Koryu Yamamoto, Kawasaki (JP);
Ross Dale, Pella, IA (US)

(73) Assignee: Ajinomoto U.S.A. Inc., Paramus, NJ (US)

( * ) Notice: Subject to any disclaimer, the term of this patent is extended or adjusted under 35 U.S.C. 154(b) by 0 days.

(21) Appl. No.: 09/950,687

(22) Filed: Sep. 13, 2001

(65) Prior Publication Data

US 2003/0049363 A1 Mar. 13, 2003

(51) Int. Cl.
*A61K 35/78* (2006.01)

(52) U.S. Cl. .................. 424/776; 424/438; 424/725; 426/630; 47/57.6; 47/57.7

(58) Field of Classification Search ................ 424/438, 424/776, 725; 426/630; 47/57.6, 57.7
See application file for complete search history.

(56) References Cited

U.S. PATENT DOCUMENTS

| | | | |
|---|---|---|---|
| 3,988,480 A | 10/1976 | Ames et al. | |
| 4,016,296 A | 4/1977 | De Santis | |
| 4,027,043 A | 5/1977 | Schroeder et al. | |
| 4,062,988 A | 12/1977 | De Santis | |
| 4,160,041 A | 7/1979 | Schroeder et al. | |
| 4,171,385 A | 10/1979 | Skoch et al. | |
| 4,171,386 A | 10/1979 | Skoch et al. | |
| 4,234,608 A | 11/1980 | Linehan et al. | |
| 4,265,916 A | 5/1981 | Skoch et al. | |
| RE31,763 E | 12/1984 | Skoch et al. | |
| RE31,804 E | 1/1985 | Skoch et al. | |
| 4,499,110 A | 2/1985 | Tomko et al. | |
| 4,702,922 A | 10/1987 | Wiesenberger et al. | |
| 4,708,877 A | 11/1987 | Donovan et al. | |
| 4,731,249 A | 3/1988 | Findley | |
| 4,735,809 A | 4/1988 | Donovan et al. | |
| 4,798,727 A | 1/1989 | Miller | |
| 4,800,092 A | 1/1989 | Miller | |
| 4,803,085 A | 2/1989 | Findley | |
| 4,826,694 A | 5/1989 | McAskie | |
| 4,904,486 A | 2/1990 | Donovan et al. | |
| 4,909,138 A | 3/1990 | McAskie | |
| 4,963,371 A | 10/1990 | Miller | |
| 4,994,282 A | 2/1991 | Miller | |
| 5,068,114 A | 11/1991 | Chanen et al. | |
| 5,073,388 A | 12/1991 | Miller | |
| 5,204,102 A | * | 4/1993 | Coles et al. |
| 5,363,754 A | 11/1994 | Coles et al. | |
| 5,560,920 A | 10/1996 | Goff et al. | |
| 5,626,891 A | 5/1997 | Aii et al. | |
| 5,750,466 A | 5/1998 | Wedegaertner et al. | |
| 5,787,640 A | * | 8/1998 | Duke |
| 5,972,414 A | 10/1999 | Harris | |
| 6,051,269 A | 4/2000 | Harris | |

OTHER PUBLICATIONS

A.C. Sheperd, et al., "Long-Term Effects of Acetate and Propionate on Voluntary Feed Intake by Midlactation Cows", J. Dairy Sci, vol. 81, pp. 2240-2250, 1998.

D.M. Waltz, et al., "Effect of Acid and Alkali Treatment of Soybean Meal on Nitrogen Utilization by Ruminants", J. Anim. Sci., vol. 63, pp. 879-887, 1986.

* cited by examiner

*Primary Examiner*—Susan D. Coe
(74) *Attorney, Agent, or Firm*—Oblon, Spivak, McClelland, Maier & Neustadt, P.C.

(57) ABSTRACT

A method for the preparation of a handleable, flowable coated cottonseed product is provided which involves coating cottonseed with a composition of (a) water or a liquid feed product, (b) one or more organic acids and (c) a metal compound capable of interacting with the one or more organic acids to form a coating on the cottonseed, and curing the coating formed thereby, and the flowable cottonseed product formed thereby, as well as its use as a feed supplement for ruminants such as cattle, as a plantable source of cottonseed, in a method for treatment and/or prevention of urinary calculi or prevention of milk fever in cattle, or in a method for increasing milk fat in dairy cattle, a method for increasing milk production in dairy cattle, and a method for preventing ketosis in ruminants.

58 Claims, No Drawings

FLOWABLE COTTONSEED AND METHOD FOR ITS PREPARATION

BACKGROUND OF THE INVENTION

1. Field of the Invention

The present invention relates to a cottonseed composition having improved flowability and handlability and a method for its preparation, and its use as a feed for ruminants, particularly cattle or as a plantable source of cottonseed.

2. Discussion of the Background

Cottonseed is an ideal feed ingredient for ruminants, due to the balanced combination of protein, fiber and other nutrients contained therein. However, its use has not been widespread, due to significant handling problems. Cottonseed used for feeding has an outer coating of short cotton linters (short fibrous "hair-like" structures). These linters remain on the cottonseed after processing in cotton gins. During normal handling, the linters cause the cottonseed to clump together and cause difficulties in handling with traditional feed-grain handling equipment.

One solution proposed for this problem has been the preparation of a starch coated cottonseed. This is described in Wedegaertner, U.S. Pat. No. 5,750,466. The starch-coated cottonseed is produced by spraying gelatinized starch on the cottonseed and drying the coating. However, this process is very energy intensive and expensive, requiring significant expenditures in equipment for its production.

A different proposal for solving this problem has been proposed in a process for delinting the cottonseed by treatment with dilute acid or base, followed by drying, buffing and neutralization. The product so produced however, is not used for feed, but is instead used as cottonseed for planting.

Another proposal for solving this problem is that set forth in U.S. patent application Ser. No. 09/768,623, filed Jan. 25, 2001 by the present inventors. In that application, cottonseed is coated using a coating composition comprising (a) a member selected from the group consisting of water and liquid feed products, (b) a soluble phosphorous source and (c) a metal compound capable of interacting with the soluble phosphorous source to produce a coating on the cottonseed. However, this results in a cottonseed having a high phosphorous content. This can be an important consideration since overfeeding of phosphorous is often not economical beyond the nutritional requirements of the animal.

Accordingly, a method is needed to prepare a more easily handled, flowable cottonseed that provides a reduced phosphorous level in the final coated product.

SUMMARY OF THE INVENTION

Accordingly, one object of the present invention is to provide a readily handleable and flowable cottonseed product having low phosphorous content, and is suitable for use in conventional feed-grain handling equipment.

A further object of the present invention is to provide a method for the production of such a flowable, handleable cottonseed product.

A further object of the present invention is to provide a ruminant feed containing such a flowable cottonseed product.

A further object of the present invention is to provide a method for the treatment and/or prevention of urinary calculi in cows using a preferred flowable cottonseed product of the present invention.

A further object of the present invention is to provide a method for the prevention of milk fever in cows using a preferred flowable cottonseed product of the present invention.

A further object of the present invention is to provide a method for the prevention of ketosis in ruminants using a preferred flowable cottonseed product of the present invention.

A still further object of the present invention is to provide a method for increasing milk fat in dairy cattle using a preferred flowable cottonseed product of the present invention.

Another object of the present invention is to provide a method for increasing milk production in dairy cattle using a preferred flowable cottonseed product of the present invention.

These and other objects of the present invention have been satisfied by the discovery of a coated cottonseed product comprising cottonseed coated with a coating composition comprising (a) water or a liquid feed product, (b) one or more organic acids and (c) a metal compound that interacts with the one or more organic acids to create a shell around the cottonseed, a method for its production and its use as a feed or plantable source of cottonseed, as well as a variety of methods for improving the health and productivity of ruminants, particularly dairy cattle.

DETAILED DESCRIPTION OF THE PREFERRED EMBODIMENTS

The present invention-relates to a method for the production of a flowable, handleable cottonseed and the cottonseed product produced thereby. In particular, the cottonseed product of the present invention comprises cottonseed having cured coating formed from a mixture of either water or a liquid feed product, such as condensed fermentation solubles, corn steep liquor, distillers solubles or molasses, along with one or more organic acids and a metal compound that interacts with the one or more organic acids to create a shell around the cottonseed, such as an alkaline earth metal.

The method of the present invention comprises coating cottonseed with a coating composition comprising:

(a) either water or a liquid feed product, preferably a member selected from the group consisting of condensed fermentation solubles, corn steep liquor, distillers solubles and molasses;

(b) one or more organic acids, preferably one or more water-soluble organic acids; and (c) a metal that interacts with the one or more organic acids to create a coating around the cottonseed.

Upon coating the cottonseed with the above composition, the organic acid and the metal compound cause curing, such as by reacting exothermically to form salt complexes that solidify or gel the liquid feed product, such as condensed fermentation solubles, corn steep liquor, distillers solubles or molasses, to form a coating on the cottonseed. Within the context of the present invention, the term "curing" or "cure" indicates an interaction between two or more components of the coating composition to cause the coating to solidify or gel, thus forming a hardened coating. Included within this term is the exothermic reaction of the organic acid and the metal compound to form a salt complex or complexes, which aid in the solidification or gelling of the coating composition. Generally, the coating thus formed is very tacky or sticky. The resulting coated cottonseed is then dried to reduce the coating moisture level to less than 12 wt %, based on total coated cottonseed, preferably less than 10 wt % moisture, more preferably less than 7.5 wt % moisture. The resulting coated cottonseed is readily handleable and flowable, using conventional feed-grain handling equipment.

The liquid feed product (within the context of the present invention, the liquid feed product includes both products and byproducts of fermentation processes, grain processing or molasses production including beet, cane or citrus) can be any composition formed by fermentation, grain processing or molasses production that can be caused to harden by mixing with an organic acid and a metal compound, such as an alkaline earth metal compound. Suitable liquid feed products include condensed fermentation solubles, corn steep liquor, distillers solubles, yeast paste, liquid whey or molasses. Preferred embodiments of liquid feed products include condensed glutamic fermentation solubles, such as Proteferm® (a byproduct of monosodium glutamate fermentation available from Ajinomoto USA, Inc.). In one embodiment, even water alone can be the liquid of the coating composition.

In the process of the present invention, any organic acid can be used, so long as it can react with the metal compound to form a coating on the cottonseed. Preferably, the organic acid is a water-soluble organic acid, in order to provide better uniformity of coating in the coating process. More preferably, the organic acid is at least one member selected from the group consisting of lactic acid, acetic acid, citric acid and propionic acid. Most preferably the organic acid is acetic acid or propionic acid, depending on the additional benefits desired from the resulting coated product. As noted below, propionic acid is a gluconeogenic agent that is converted by cows into glucose for energy. Thus, use of propionic acid can provide a high energy source feed for the cow and can be used to assist cattle in periods of negative energy balance, such as early lactation in dairy cows. It can also assist in prevention of metabolic diseases such as ketosis. Acetic acid is also preferred for use in coated cottonseed for dairy cows, as it increases milk fat percentage and production of milk. A most preferred combination of acids is the use of both acetic and propionic acids, providing the added benefits of each as noted above. It is, of course, preferred that the acid be biocompatible itself or at least quickly metabolize in the body to form biocompatible compounds, in order that the coated cottonseed does not have an adverse effect on the health of the animal ingesting it. The organic acid of the present composition can be provided as a single compound or as a mixture of two or more compounds. Further, the organic acid can be provided as the pure compound or in the form of a broth containing sufficient amounts of one or more organic acids. As an example of such a broth, acetic acid and propionic acid are both commercially prepared from whey and corn distillery products, as a step in the manufacture of calcium-magnesium acetate used in road de-icers. The resulting broths from the whey or corn distillery could be used, prior to their conversion into the salts used in the above-noted road de-icers, as the source for acetic or propionic acids, without further purification. Additionally, citric acid is prepared from fermentation and purification from a citric acid broth. The broth could be used as the source for citric acid without further purification. Such use of broths would add further cost savings to the present process.

Additionally, the coating composition of the present invention can further comprise a soluble phosphorous source, such as disclosed in U.S. patent application Ser. No. 09/768,623, although in the present invention it would necessarily be used in conjunction with the organic acid, to adjust the phosphorous content of the final product to any desired level. (Within the context of the present invention, the term "soluble phosphorous" means a compound or composition capable of providing phosphorous in a water-soluble form.) Suitable soluble phosphorous sources include, but are not limited to, phosphoric acid, phosphorous acid, diammonium phosphate, monoammonium phosphate, alkali and alkaline metal phosphates, alkali and alkaline metal phosphonates. The phosphorous can be provided as a single compound or as a mixture of two or more compounds.

The coating composition can further comprise, if desired, one or more inorganic acids that are biocompatible, used in conjunction with the one or more organic acids.

With respect to the metal compound, any salt of a metal capable of reacting with the organic acid to form a coating from the mixture is acceptable, so long as no toxicity to the consumer of the final product is present. Preferred salts include sulfates, carbonates, halides, oxides, hydroxides, propionates, and acetates. Preferred metal compounds are salts of an alkaline earth metal or aluminum. More preferred alkaline earth metal sources include salts of Ca, Mg and Al, such as calcium carbonate, calcium oxide, calcium chloride, calcium sulfate, calcium hydroxide, calcium propionate, calcium acetate, magnesium oxide, magnesium chloride, magnesium sulfate, magnesium hydroxide and aluminum oxide, with calcium hydroxide and magnesium oxide being most preferred. The metal compound can be provided in a single compound or in a combination of two or more compounds. Further, two or more different metal compounds can be used in combination.

The coating composition of the present invention can use the components (a)–(c) in any desired ratios, so long as the resulting coating composition can cure (or be dried) to form a coating on the cottonseed, preferably a hardened (i.e. non-sticky or non-tacky) coating after drying. Preferably, the coated cottonseed product comprises from 40 to 85% by weight of cottonseed, from 10 to 30% by weight of the liquid feed product (or water), from 3 to 10% by weight of organic acid, and from 2 to 8% by weight of the metal compound (on a wt % metal basis). Most preferably, the composition comprises from 50 to 80% by weight of cottonseed, from 15 to 30% by weight of liquid feed product (or water), from 5 to 10% by weight of organic acid and from 2.5 to 6% by weight of metal compound.

It is possible to provide the organic acid and the metal compound in the same compound, such as an alkaline earth metal acetate, so long as the acid salt is initially water soluble.

In addition to the required components of the present invention, the present coated cottonseed can include other additives, such as enzymes, amino acids, water absorbers, mold inhibitors, vitamins, minerals, direct fed microbials and other feed additives. One preferred additive is sodium bentonite or calcium bentonite, which can function as both a water absorber and mold inhibitor. Of particular note, the present invention permits the inclusion of heat or chemically sensitive enzymes into the coated cottonseed product, which is not possible with conventional methods requiring significant heated drying steps or acid or base treatments. Additionally, the present invention provides an added benefit for the introduction of protein feedstuffs into ruminant feed. Proteins found in protein feedstuffs, such as soy protein, corn gluten meal, cottonseed meal, distillers grains, peanut meal and any protein isolate, tend to degrade in the rumen of ruminants. However, the presence of the organic acid of the present composition, such as acetic acid or proprionic acid, can reduce the rumen degradability of the protein in the protein feedstuff. Accordingly, prior to coating the cottonseed, the protein feedstuff is mixed with the coating composition of the present invention, providing an additional nutrient benefit of the coated cottonseed product of the present invention. Although the protein feedstuffs can be used in their particulate form without any need for grinding, in a preferred embodiment, the protein feedstuff is finely ground to provide a more homogeneous mixture with the coating composition. The protein feedstuff is preferably ground to a particle size of less than 600 microns, more preferably less than 200 microns.

Once the cottonseed is coated with the coating composition of the present invention, the coated product is permitted to cure, thus causing the coating to harden. As noted above, the curing process generally is believed to involve the reaction of the organic acid and the metal compound to form a salt, which solidifies or gels the liquid feed product. The reaction typically is quick, requiring less than 30 minutes, preferably only around 5–10 minutes. The curing process is temperature and time dependent, but normally lasts from several minutes to several weeks. After the curing/reaction is completed, it may be necessary to dry the coated product. Drying can be performed using any conventional drying technique. Preferably, the drying is performed using forced air that can be cold, cool, warm or hot, preferably at a temperature of from 15 to 200° C., more preferably from 25 to 100° C. The air used for the drying process can also be low relative humidity air, in order to speed the process by withdrawing excess moisture from the coating as it dries. In the event that the process is performed without a drying step, it is preferred that the coated product be allowed to cure an additional 24 to 48 hours. This additional curing can be performed in any storage area, but is preferably performed on a flattened surface, in order to avoid sticking of the individual grains of caoted cottonseed to one another prior to complete curing. In one embodiment, the additional curing is performed on a drying floor, through which air is flowing at ambient temperature, or even with the air or floor being slightly heated to speed the curing process. This embodiment would be particularly useful in the event that the composition contains heat sensitive components, such as heat sensitive enzymes.

In order to assist the drying process and the formation of the hardened coating of the present invention, it is preferred that the composition further contain bentonite (such as calcium bentonite or sodium bentonite) in an amount of up to 10 wt % (based on total coated cottonseed). This also facilitates handling and movement of the cottonseed through the handling equipment.

In a preferred process of coating the cottonseed, the cottonseed is first coated with an aqueous solution of alkaline earth metal, such as calcium hydroxide or magnesium oxide. Separately, a liquid solution is prepared containing the water or liquid feed product, the organic acid, such as citric acid, acetic acid or propionic acid, and if desired other additives, such as sodium bentonite. The liquid solution is then combined with the alkaline earth metal coated cottonseed, to permit the coating to be formed and the curing reaction to begin.

Alternatively, a preferred process of coating the cottonseed involves coating the cottonseed first with the liquid feed product, the organic acid, and other additives as desired. This can be done as a single aqueous solution of the liquid feed product (or since the liquid feed product itself is normally aqueous in nature, it can act as the aqueous part of the solution), organic acid and any other additives, or can be done sequentially if desired. Preferably, the ingredients are premixed to form a more uniform coating on the cottonseed. This coated cottonseed is then combined with an aqueous solution of the alkaline earth metal salt, to complete the coating and begin the curing process.

In a further embodiment, when propionic acid is used as the organic acid, the hardening/curing process can be assisted by addition of a glycol or polyol, such as propylene glycol. Propylene glycol would be most preferred for such an embodiment, as it is also a gluconeogenic agent and provides additional nutritional value to the end product. The glycol, such as propylene glycol, should be added in an amount of 0.5 to 4 parts glycol to 1 part propionate salt on a vol/wt basis, preferably 1 part propylene glycol to 2 parts calcium propionate in a preferred embodiment.

The cottonseed product formed according to the present invention can be used as a feed for ruminants, such as cattle, as well as for a plantable source of cottonseed that is readily handled without clumping, using conventional feed and grain handling equipment. The coating of the cottonseed can provide additional nutrients, either to the ruminant animal or to the seed as it germinates, thus enhancing the value of the cottonseed to the animal or to the farmer that has planted it. The product of the present invention has improved handling characteristics and significantly greater bulk density compared to whole fuzzy cottonseed. Other advantages include:

Improved handling with traditional grain handling equipment versus bulk handling used with whole fuzzy cottonseed;

Mixes into total mixed rations better and more uniformly than whole fuzzy cottonseed, resulting in more uniform intake of nutrients;

Provides ability to add liquid byproducts to dairy rations without the need for specialized liquid handling equipment currently required;

Micro-nutrients, as well as direct fed microbials, can be added in the coating process to provide more uniform dispersion in the feed;

Provides a means for incorporating higher levels of molasses while avoiding problem of stickiness normally associated with such feeds.

Provides increased bulk density of the cottonseed (present invention about 28 lbs/ft, conventional cottonseed about 22 lbs/ft), lowering transportation costs and storage costs.

Substantially reduces the level of phosphorous in the coated product, relative to phosphorous based coatings and allows for fine-tuning of the amount of phosphorous in the final coated product by replacing phosphorous sources with organic acid.

The use of some organic acids, such as acetic acid or proprionic acid, can decrease the rumen degradability of proteins when mixed with a protein feedstuff. Accordingly, adding a protein feedstuff, such as soy protein, to these acids just prior to coating would add an additional nutrient to coated cottonseed feed materials.

Calcium propionate is a commercially available gluconeogenic supplement in the ruminant feed industry. Cattle convert propionate into glucose for use as energy. During periods of negative energy balance such as early lactation in dairy cows, providing a glucose precursor can bolster the cows available energy and help prevent metabolic diseases such as ketosis (high blood ketones due to low glucose avaialability). Thus the use of a the preferred propionic acid in the coating process, or even the use of calcium propionate as both the acid and the metal compound, adds the benefit of a gluconeogenic agent to the coated cottonseed of the present invention.

Dairy cows that ingest acetic acid have been shown to have higher milk fat percentage and higher milk production, an added benefit for the use of the preferred acetic acid of the present invention.

The present invention further relates to methods for the prevention and treatment of urinary calculi (or water belly) in ruminants, as well as the prevention of milk fever. Urinary calculi is a problem encountered in ruminants due to mineral deposits in the urinary tract. Typically such prolonged blockage can result in rupture of the urinary bladder or urethra, releasing urine into the surrounding tissues. This produces the condition known as "water belly". Urinary calculi of the phosphatic type is formed principally under feedlot conditions due to nutritional conditions that promote the formation of urine that is alkaline and has a high phosphorous content, while the animal has a deficiency of calcium. Normally, in order to treat or prevent such a condition from occurring, it is necessary to supplement the animals feed with calcium supplements, or by feeding ammonium chloride or ammonium sulfate to the animal. The preferred coated cottonseed product of the present invention, wherein the liquid feed product is Proteferm, can be used to prevent and/or treat urinary calculi or water belly, since Proteferm contains a significant level of ammonium chloride. Further the low phosphorous content of the present product helps to prevent such urinary calculi from forming.

Milk fever is a condition that affects about 6% of dairy cows in the US each year. This condition results in decreased calcium concentration in the blood (below 5 mg/dl), which does not permit muscles and nerves to function properly. Normal blood calcium levels are around 9 to 10 mg/dl. One conventional preventative for milk fever is to supplement the cows diet with anionic elements, such as chloride or sulfate, for example by the addition of ammonium chloride to the diet. This causes a decrease in blood pH. As in the above noted treatment of urinary calculi, the preferred embodiment of the coated cottonseed of the present invention, having a coating of Proteferm, provides significant levels of ammonium chloride, as well as other nutrients. This can help prevent the occurrence of milk fever without requiring any additional feed supplements.

Having generally described this invention, a further understanding can be obtained by reference to certain specific examples which are provided herein for purposes of illustration only and are not intended to be limiting unless otherwise specified.

EXAMPLES

Example 1

Using the percentage amounts shown in the following table, a solution was formed by combining the liquid feed product (either Proteferm (a condensed glutamic acid fermentation solubles product available from Ajinomoto USA) or molasses), the organic acid or acids and, optionally, sodium bentonite. The resulting solution was then combined with the cottonseed to thoroughly coat the cottonseed. This was then thoroughly mixed with the metal compound salt (calcium hydroxide or magnesium oxide) to coat the cottonseed with the metal compound salt. The coating thus formed was allowed to react and harden at ambient temperature, followed by drying at 70° F. for 1–7 days to achieve a final moisture level of about 10% to provide the coated cottonseed. The bulk density of the resulting products is provided in the table.

The products thus formed were easily handled using conventional grain handling equipment.

TABLE

Cottonseed Coating Formulations Containing Organic Acids (% as is basis)

| Ingredient | A | B | C | D | E | F | G | H |
|---|---|---|---|---|---|---|---|---|
| Cottonseed | 60 | 85 | 76.9 | 77.5 | 59.4 | 52 | 52 | 41 |
| Acetic Acid | 10 | 10 | 5 | | | | | 5 |
| Propionic Acid | | | | 5 | | | | 5 |
| Citric Acid | | | | | 10 | | | |
| Lactic Acid | | | | | | 6 | 6 | |
| Water | | | 15 | 15 | 25 | | | |
| Proteferm | 25 | | | | | 15 | 15 | 30 |
| Molasses | | | | | | 15 | 15 | |
| Soybean protein | | | | | | | | 7 |
| Calcium hydroxide | 5 | | 3.1 | 2.5 | 5.6 | | 6 | 2 |
| Magnesium oxide | | 5 | | | | 6 | | 2 |
| Bentonite | | | | | | 6 | 6 | 8 |
| Bulk Density (lbs/cubic ft) | 31.2 | 25.8 | 20.3 | 21 | 22.2 | 32.3 | 30.2 | 27.8 |

As a reference, the bulk density of whole fuzzy cottonseed used in these formulations was measured to be 17.5 lbs/cubic ft, showing the significant improvement in bulk density achieved in the present invention.

Obviously, additional modifications and variations of the present invention are possible in light of the above teachings. It is therefore to be understood that within the scope of the appended claims, the invention may be practiced otherwise than as specifically described herein.

The invention claimed is:

1. A method for the production of a coated cottonseed product, comprising:
    coating whole or intact cottonseed with a coating composition comprising:
        (a) glutamic acid fermentation solubles, condensed glutamic acid fermentation solubles, a nutritive byproduct of monosodium glutamate production or Proteferm (a nitrogen source which is a fermentation product of monosodium glutamate production),
        (b) one or more organic acid(s) and
        (c) a metal compound that interacts with said one or more organic acid(s)
    to produce a coating on the cottonseed; and
    curing the coated cottonseed formed thereby.

2. The method of claim 1, wherein said liquid feed product is glutamic acid fermentation solubles.

3. The method of claim 1, wherein said liquid feed product is condensed glutamic acid fermentation solubles.

4. The method of claim 1, wherein said coating composition comprises a liquid feed product which is a nutritive byproduct of monosodium glutamate fermentation.

5. The method of claim 1, wherein said liquid feed product is Proteferm (a nitrogen source which is a fermentation byproduct of monosodium glutamate production).

6. The method of claim 1, wherein said at least one organic acid is selected from the group consisting of acetic acid, citric acid, lactic acid, and propionic acid.

7. The method of claim 1, wherein said at least one organic acid is acetic acid.

8. The method of claim 1, wherein said at least one organic acid is citric acid.

9. The method of claim 1, wherein said at least one organic acid is lactic acid.

10. The method of claim 1, wherein said at least one organic acid is propionic acid.

11. The method of claim 1, wherein said at least one organic acid is a combination of acetic acid and propionic acid.

12. The method of claim 1, wherein said metal compound is selected from the group consisting of alkaline earth metal compounds and aluminum compounds.

13. The method of claim 1, wherein said metal compound is an alkaline earth metal compound.

14. The method of claim 1, wherein said metal compound is a calcium salt.

15. The method of claim 1, wherein said metal compound is calcium hydroxide.

16. The method of claim 1, wherein said metal compound is calcium carbonate.

17. The method of claim 1, wherein said metal compound is a magnesium salt.

18. The method of claim 1, wherein said metal compound is magnesium oxide.

19. The method of claim 1, wherein said metal compound is an aluminum compound.

20. The method of claim 1, wherein said metal compound is aluminum oxide.

21. The method of claim 1, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

22. The method of claim 1, wherein said coating composition based on the total weight of the coated cottonseed product comprises:
   (a) from 15 to 30 wt % glutamic acid fermentation solubles, condensed glutamic acid fermentation solubles, a nutritive by-product of monosodium glutamate production or Proteferm (a nitroaen source which is a fermentation product of monosodium glutamate production),
   (b) from 3 to 10 wt % of one or more organic acid(s), and
   (c) from 2 to 8 wt % of at least one metal compound capable of interacting with said one or more organic acid(s) to produce a coating on the cottonseed.

23. The method of claim 1, wherein said coating composition further comprises one or more additive(s) selected from the group consisting of enzyme(s), amino acid(s), water absorber(s), vitamin(s), mineral(s), direct fed microbial(s) and mold inhibitor(s).

24. The method of claim 23, wherein, said coating composition comprises one or more additive(s) is selected from the group consisting of heat sensitive enzyme(s) and sodium bentonite.

25. The method of claim 1, wherein coating comprises:
   coating whole or intact cottonseed with (c) said metal compound;
   mixing together at least one liquid feed product selected from the group consisting of (a) glutamic acid fermentation solubles, condensed glutamic acid fermentation solubles, a nutritive by-product of monosodium glutamate production and Proteferm (a nitrogen source which is a fermentation product of monosodium glutamate production), and (b) said one or more added organic acid(s); thus forming a liquid solution, and combining said liquid solution with the cottonseed coated with (c).

26. A coated cottonseed product, comprising:
   intact or whole cottonseed and a cured coating prepared from a coating composition comprising:
      (a) glutamic acid fermentation solubles, condensed glutamic acid fermentation solubles, a nutritive by-product of monosodium glutamate production or Proteferm (a nitrogen source which is a fermentation product of monosodium glutamate production),
      (b) one or more organic acid(s) and
      (c) a metal compound that interacts with said one or more organic acid(s) to form a coating on said cottonseed.

27. The product of claim 26, wherein said liquid feed product is glutamic acid fermentation solubles.

28. The coated cottonseed product of claim 26, wherein said liquid feed product is condensed glutamic acid fermentation solubles.

29. The coated cottonseed product of claim 26, wherein said coating composition comprises a liquid feed product which is a nutritive byproduct of monosodium glutamate fermentation.

30. The product of claim 26, wherein said liquid feed product is Proteferm (a nitrogen source which is a fermentation byproduct of monosodium glutamate production).

31. The product of claim 26, wherein said at least one organic acid is selected from the group consisting of acetic acid, citric acid, lactic acid, and propionic acid.

32. The product of claim 26, wherein said at least one organic acid comprises acetic acid.

33. The product of claim 26, wherein said at least one organic acid comprises citric acid.

34. The product of claim 26, wherein said at least one organic acid comprises lactic acid.

35. The product of claim 26, wherein said at least one organic acid comprises propionic acid.

36. The product of claim 26, wherein said at least one organic acid comprises a combination of acetic acid and propionic acid.

37. The product of claim 26, wherein said metal compound is selected from the group consisting of alkaline earth metal compounds and aluminum compounds.

38. The product of claim 26, wherein said metal compound is an alkaline earth metal compound.

39. The product of claim 26, wherein said metal compound is a calcium salt.

40. The product of claim 26, wherein said metal compound is calcium hydroxide.

41. The product of claim 26, wherein said metal compound is calcium carbonate.

42. The product of claim 26, wherein said metal compound is a magnesium salt.

43. The product of claim 26, wherein said metal compound is magnesium oxide.

44. The product of claim 26, wherein said metal compound is an aluminum compound.

45. The product of claim 26, wherein said metal compound is aluminum oxide.

46. The product of claim 26, wherein said metal compound is selected from the group consisting of calcium carbonate, calcium oxide, calcium chloride, calcium sulfate, calcium hydroxide, calcium propionate, calcium acetate, magnesium oxide, magnesium chloride, magnesium sulfate, and magnesium hydroxide.

47. The product of claim 26, wherein said coating composition comprises based on the total weight of the coated cottonseed product:
 (a) from 15 to 30 wt % of glutamic acid fermentation solubles, condensed glutamic acid fermentation solubles, a nutritive by-product of monosodium glutamate production or Proteferm (a nitrogen source which is a fermentation product of monosodium glutamate production),
 (b) from 3 to 10 wt % of one or more organic acid(s), and
 (c) from 2 to 8 wt % of at least one metal compound capable of interacting with said one or more organic acid(s) to produce a coating on the cottonseed.

48. The product of claim 26, wherein said coating composition further comprises one or more additive(s) selected from the group consisting of enzyme(s), amino acid(s), water absorber(s), vitamin(s), mineral(s), direct fed microbial(s) and mold inhibitor(s).

49. The product of claim 48, wherein said coating comprises one or more additives is selected from the group consisting of heat sensitive enzymes and sodium bentonite.

50. The product of claim 26, which is produced by a process of:
 coating whole or intact cottonseed with (c) said metal compound;
 forming a liquid solution of (a) said glutamic acid fermentation solubles, condensed glutamic acid fermentation solubles, a nutritive by-product of monosodium glutamate production or Proteferm (a nitrogen source which is a fermentation product of monosodium glutamate production),
 and (b) said one or more organic acid(s); and
 combining said liquid solution with the cottonseed coated with (c).

51. A ruminant feed composition, comprising the coated cottonseed product of claim 26 and one or more conventional ruminant feed constituent(s).

52. A plantable cottonseed composition comprising the coated cottonseed product of claim 26 and optionally one or more nutrients for the cottonseed as it germinates.

53. A method for producing a coated cottonseed product, comprising:
 coating whole or intact cottonseed with a coating composition comprising:
 (a) a liquid feed product selected from the group consisting of condensed glutamic acid fermentation solubles, glutamic acid fermentation solubles, a nutritive byproduct of monosodium glutamate production, and Proteferm (a nitrogen source which is a fermentation byproduct of monosodium glutamate production),
 (b) one or more organic acid(s) and
 (c) a calcium salt that interacts with said one or more organic acid(s) to
 produce a coating on the cottonseed; and
 curing the coated cottonseed formed thereby.

54. The method of claim 53, wherein said liquid feed product is condensed glutamic acid solubles and the organic acid comprises acetic acid.

55. A coated cottonseed product, comprising:
 intact or whole cottonseed and a cured coating prepared from a coating composition comprising:
 (a) a liquid feed product selected from the group consisting of condensed glutamic acid fermentation solubles, glutamic acid fermentation solubles, a nutritive byproduct of monosodium glutamate production, and Proteferm (a nitrogen source which is a fermentation byproduct of monosodium glutamate production),
 (b) one or more organic acid(s) and
 (c) a calcium salt that interacts with said one or more organic acid(s) to form a coating on said cottonseed.

56. A coated cottonseed product, comprising:
 intact or whole cottonseed and a cured coating prepared from a coating composition comprising:
 (a) glutamic acid fermentation solubles, condensed glutamic acid fermentation solubles, a nutritive by-product of monosodium glutamate production or Proteferm (a nitrogen source which is a fermentation product of monosodium glutamate production),
 (b) one or more organic acid(s) comprising acetic acid and
 (c) a metal compound that interacts with said one or more organic acid(s) to form a coating on said cottonseed.

57. A ruminant feed composition, comprising the coated cottonseed product of claim 30 and one or more conventional ruminant feed constituent(s).

58. A plantable cottonseed composition comprising the coated cottonseed product of claim 30 and optionally one or more nutrients for the cottonseed as it germinates.

* * * * *